Figure 1:
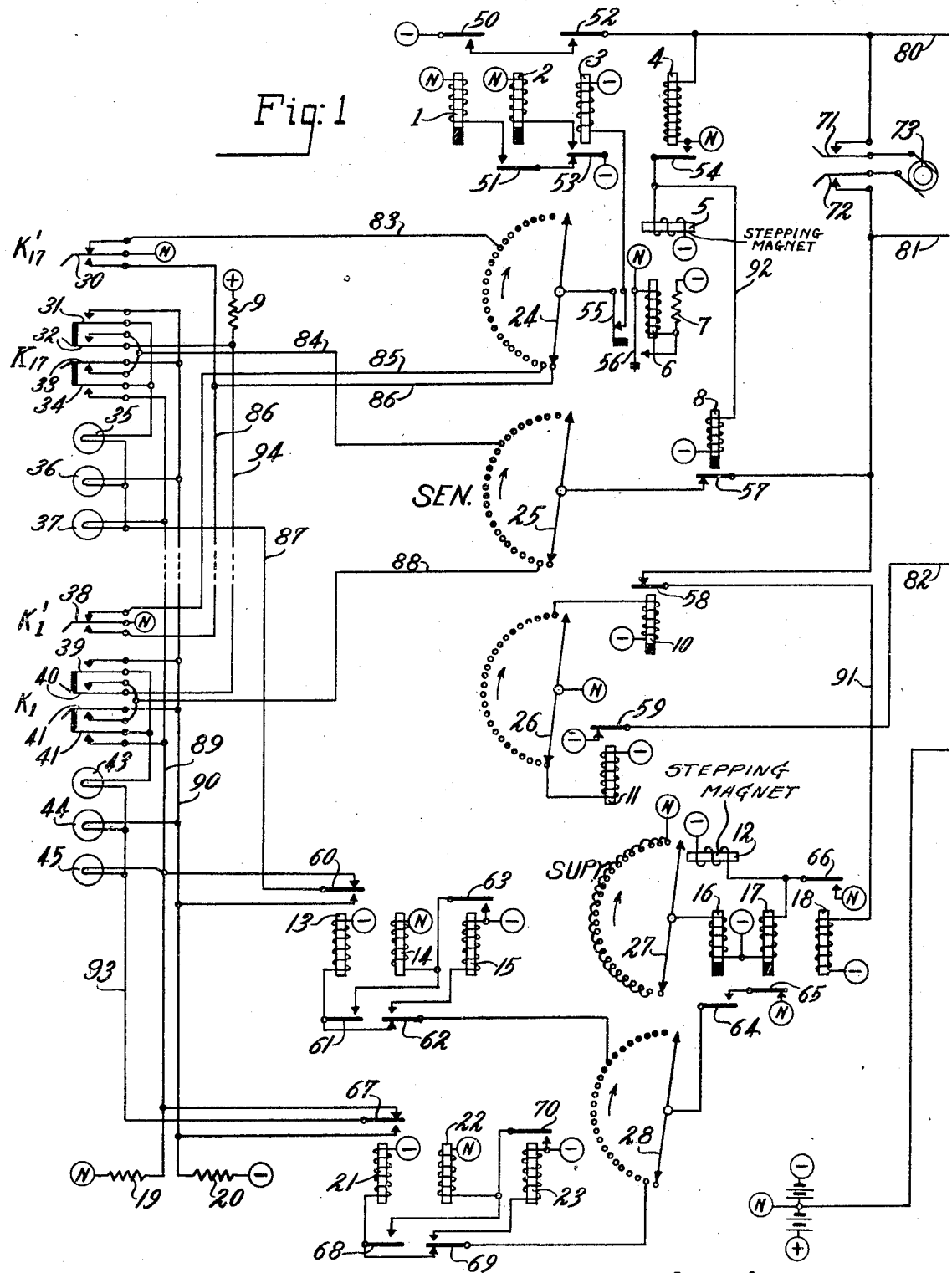

Aug. 23, 1932.  A. H. BELLIVEAU  1,872,647
REMOTE CONTROL SYSTEM
Filed Oct. 8, 1927    4 Sheets-Sheet 4

Inventor
Alfred H. Belliveau

Patented Aug. 23, 1932

1,872,647

UNITED STATES PATENT OFFICE

ALFRED H. BELLIVEAU, OF CHICAGO, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

REMOTE CONTROL SYSTEM

Application filed October 8, 1927. Serial No. 224,788.

This invention relates in general to remote control and supervision systems, more particularly to such systems in which a plurality of devices located in a plurality of substations are controlled and supervised over a trunk line leading to the substation in tandem, and the principal object of the invention, briefly stated, is the provision of a new and improved remote control system of the tandem type, the improvements tending to make the system cheaper to install and maintain without impairing its reliability.

In a system of this kind, it is customary to have a switch at the despatcher's station stepped in synchronism with a switch at each of the substations controlled over the circuit, and the successful operation of the system depends upon the synchronized operation of the switches. It will be readily seen that if one of the switches gets out of step, a switching error will occur, and the result from that error may be costly. Various systems devised heretofore, and of which I am aware, have provided elaborate means for keeping the selecting switches in synchronism, those schemes being subject to criticism because of the complexity of the apparatus used for the purpose.

As an object of my invention, I provide a new and improved arrangement for preventing a switching error due to an unsynchronized operation of the selecting switches.

Substations of the kind controlled by the system of my invention, usually contain devices which are at times automatically operated in response to an unusual load condition, or manually operated by an attendant at the substation. In order that the despatcher may intelligently control the system, he must at all times know exactly the position occupied by each device in the system, that is whether it is in its operated or unoperated position.

As a further object of my invention, I provide a new and improved supervisory arrangement, through the operation of which the position of each device in each of the substations is transmitted to the despatcher's station, to advise the despatcher of any changes which may take place in the substation.

Since there are a plurality of substations on the trunk line, it may occur that the devices in one or more of these substations will change their position at the same time. Unless special means are provided to prevent the jamming of the supervisory signals, the simultaneous operation of two or more devices will result in confusion, since each of the devices will attempt to send in its own particular signal without regard to the devices in the other substations.

As a further object of my invention, I provide a new and improved method of preventing jamming of the supervisory circuit in case two or more substations attempt to signal the despatcher's station at the same time.

Further objects of my invention, not specifically mentioned here, will be best understood from the detailed description and claims which follow.

Figure 2:
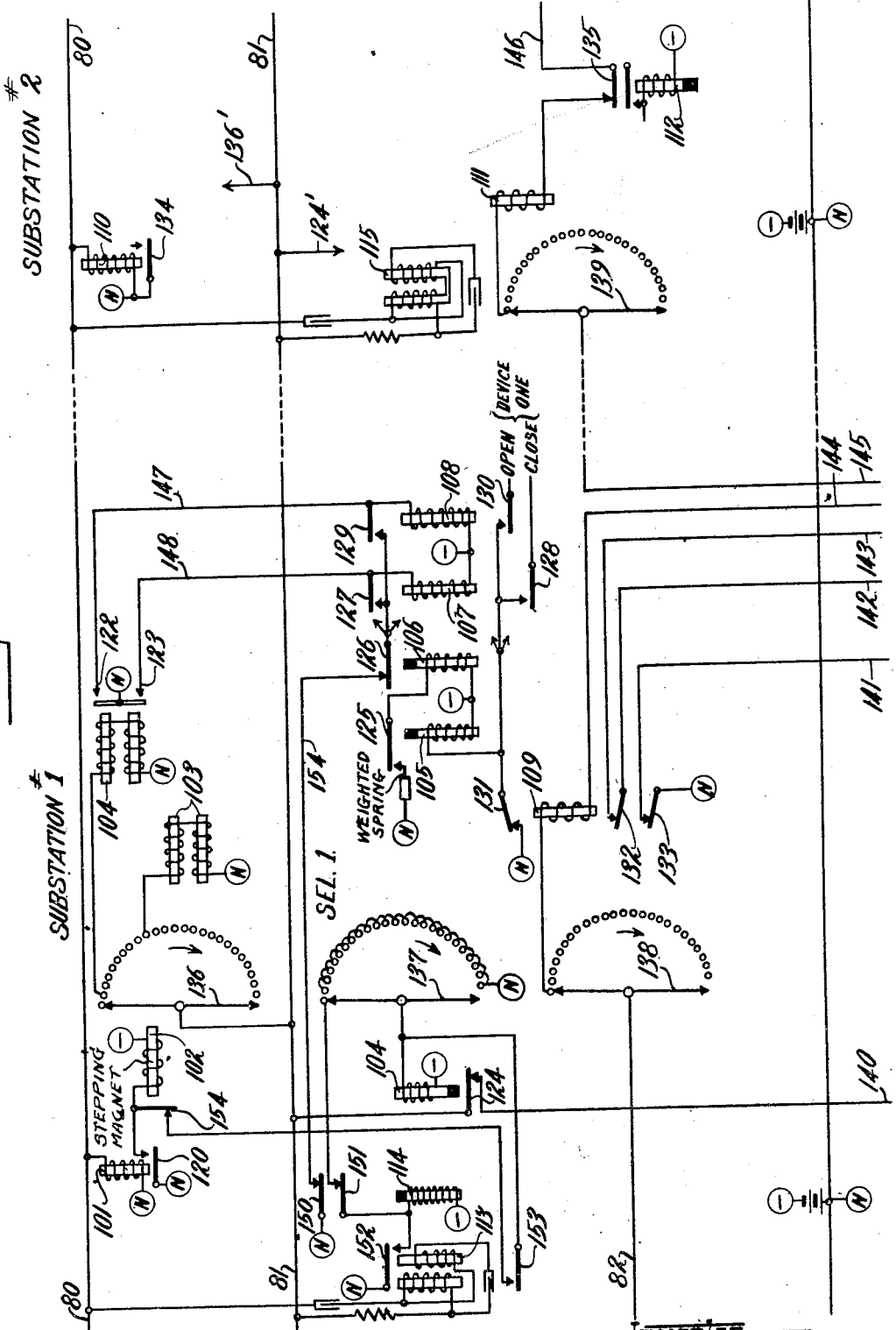
Figure 3:
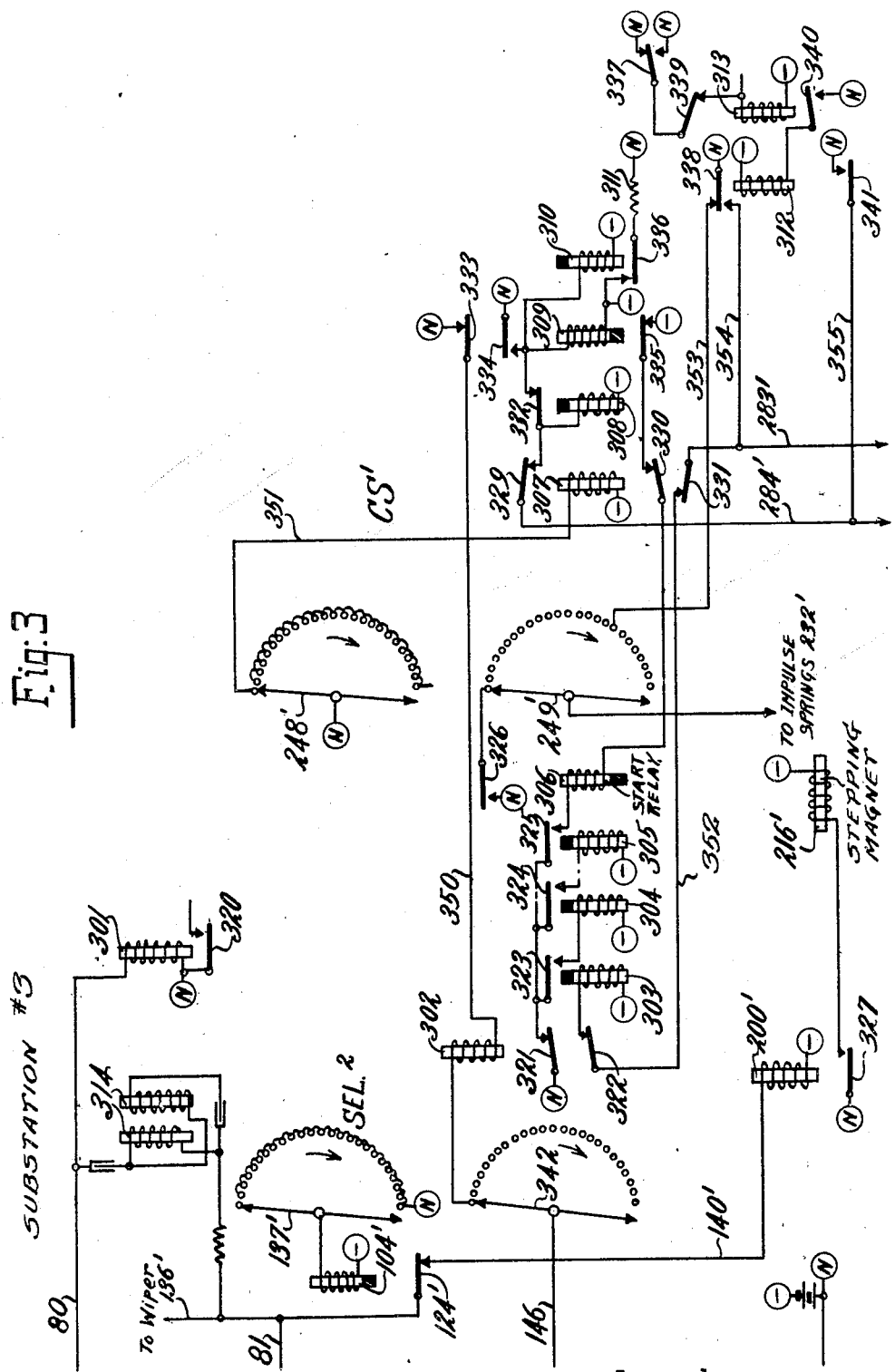
Figure 4:
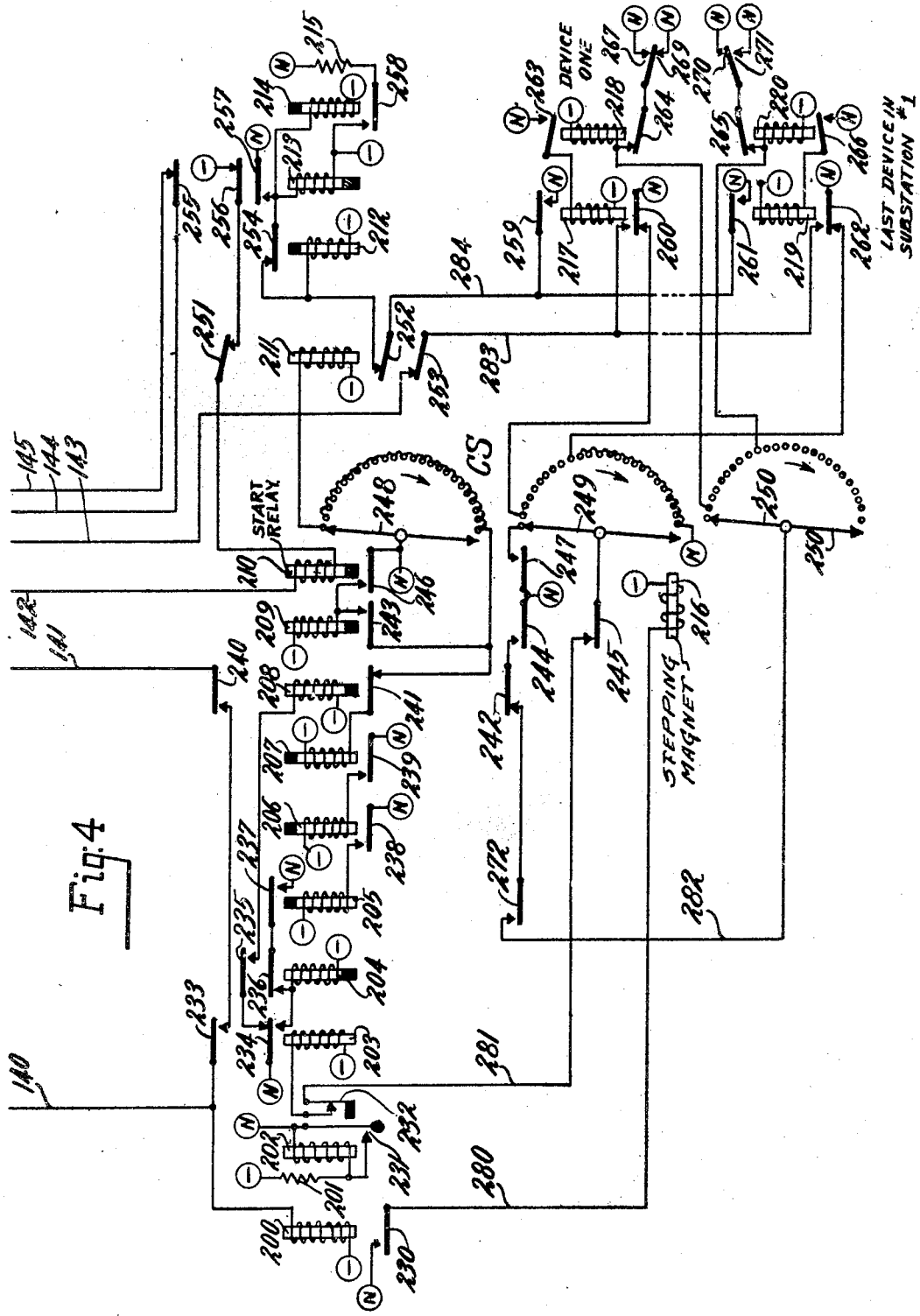

The drawings, comprising Figs. 1 to 4, inclusive, when arranged with Figs. 1, 2 and 3 in a straight line, with Fig. 4 beneath Fig. 2, and with correspondingly numbered lines in alignment, show sufficient details to enable a clear understanding of my invention.

In Fig. 1, I show the apparatus located at the despatcher's station. This apparatus includes a plurality of key sets, such as key K1 and K'1, there being one of these key sets for each of the devices controlled from the despatcher's station. Associated with each key set is a set of three lamps, indicating the out, in, and change position of each device. When the device is in its "in" position, a red light is operated, when it is in its "out" position, a green light is operated, and when a device changes its position, the white change lamp and the lamp indicating the position to which the device has moved are both lighted, to call the despatcher's attention to the change and to the particular device which changed. In the despatcher's station I also provide the sender switch SEN which is operated to position the switches of the various substations upon a contact, to select a particular device. In the despatcher's station I also provide the supervisory switch SUPY, which is operated responsive to the change of position of a device in one of the substations to control the corresponding lamp signal to indicate that change.

In Fig. 2 and Fig. 4, I show the equipment in one of the substations in detail, and to the right of Fig. 2 I have indicated in outline form, a part of the equipment in another of the substations. In Fig. 2 to the left hand side of the sheet, I show the selecting switch SEL—1 which is operated by the switch SEN to select a particular switching device. This selection is controlled through the selecting of a polar relay such as relay 104, which relay is subsequently operated to energize either relay 107 or 108. The operation of the device is controlled through circuits prepared by these relays. After the despatcher has selected a particular device and operated the polar relay corresponding thereto, the selector switch SEL—1 is stepped around into its home position, at the end of which operation a chain circuit is reestablished, and an operating circuit to the selected device completed through the operated polarized relay.

In Fig. 2, I show also a slow to pull up relay, 105, which does not close a circuit through its springs for an appreciable time after its coil is energized. A relay of this type is shown and explained in detail in the Patent 1,641,256, issued September 6, 1927 to John Erickson.

In Fig. 4, I show the supervisory equipment contained in the substation #1. This equipment consists of the sending switch CS, which is controlled by relays such as relays 217 to 220, inclusive, to send in a signal corresponding to a device which has changed its position. Two of these relays are associated with each of the devices, that is relays 217 and 218 are associated with one device. Relay 218 is normally energized, being maintained so energized through contacts on the device itself. When the device changes its position, relay 218 is deenergized, due to the momentary opening of its circuit by the special contacts on the switching device. The deenergization of relay 218 closes a circuit for relay 217, which operates to start the sender sending in a code corresponding to the device. The sending of this code is dependent upon the idle condition of the trunk line, that is the normal position of the selecting switch SEL—1, and further dependent upon whether or not the supervisory circuit is in use by another substation at the time. In Fig. 4 I show a pendulum interrupter containing magnet 202, which interrupter is constantly operating to open springs 232 periodically, thereby generating impulses which are used to operate the supervisory switch SUPY as will be hereinafter pointed out. This pendulum interrupter is similar to the interrupter V shown in Fig. 5 of the Patent to Martin L. Nelson, No. 1,705,833 granted March 19, 1929.

In Fig. 3, I show a part of the equipment in the last substation on the trunk, that equipment being shown in part to avoid an unnecessary complication and duplication of the drawings. In order that the similarity between this equipment and the equipment shown in Figs. 2 and 4 may be appreciated, corresponding parts are numbered the same, those in Fig. 3 being prime numbers to those in Fig. 2. In Fig. 3, I also show the delay circuit, through the operation of which jamming of supervisory circuit is prevented. The operation of this circuit will best be appreciated from the detailed description which follows:

Throughout the drawings I have used as battery symbols a plus sign within a circle, referred to in the specification as positive; a minus sign within a circle, referred to as negative; and an N within a circle, referred to as neutral. These symbols have been used to avoid unnecessary complication of the drawings. In an installation of the system of my invention, the despatcher's station would be provided with two storage batteries, each of about 50 volts potential, and each substation would be provided with a similar battery of 50 volts potential. The negative pole of the one battery in the despatcher's station and the positive poles of the other batteries would be joined together by a common conductor, which common might be replaced by a ground connection.

The switches SEN, SUPY, SEL and CS may well be the well known rotary line switches, such as are used in automatic telephone systems. A switch of this type is shown and described on page 38, of the second edition of the book "Principles of Automatic Telephony" by Harry P. Mahoney, published by the Automatic Electric Company, Chicago. This type of switch has twenty-five contacts in a row, accessible to a double ended wiper which moves in one direction only. The armature of this switch is arranged to advance the wipers when the magnet deenergizes.

*General description of operation*

Assume now that the despatcher desires to operate the first device at substation #1, that device being controlled by the polar relay 104. The despatcher will operate the key K'1, thereby starting the sender switch SEN in operation. The sender switch will send out impulses to the line relays 101, 110, and 301, operating those relays to step their respective switches SEL—1—SEL2 in synchronism with the sender SEN. The operation of the key K'1 removes ground from the first bank contact over which wiper 24 of the switch SEN rotates, thereby stopping the sender when one step has been taken. The switch SEL—1 has also taken one step, bringing wiper 136 into engagement with the contacts leading to the polar relay 104. The despatcher now operates key K1, to operate polar relay 104 in one direction or the other, if he closes contact 122, he prepares to open the device associated with that relay, and if he operates contact 123 prepares to close the device associated with that relay. The device to be operated by the relay 104 is not shown in the drawings, since it does not form an integral part of the present invention. Any well known electro-magnetic device, such as an electro-magnetic circuit breaker, or an electro-magnetic switch may be operated by this arrangement. It is customary to operate such devices with 110 volts direct current potential, which is more than the polar relay 104 is equipped to handle. For this reason, the circuit extended through springs 130 of the trigger relay 108 goes to a high potential relay, which is operated to directly control the switching device. After the despatcher holds key K1 closed long enough to insure that the polar relay 104 has operated, he restores the key K1', thereby replacing ground on the bank contact upon which wiper 24 is resting, to reestablish the impulsing circuit. The sender SEN then transmits impulses, setting the selector switches SEL—1—SEL2 on to their normal or home position. When the home position is reached, relay 11 is energized, to close a circuit over the trunk conductor 82 through the relay 109 at the substation 1, the relay 111 in the substation 2, and the relay 302 in the last substation, to energize those relays to indicate that all of the selecting switches are in their home positions. The circuit prepared by the trigger relay 108 is then completed, and the selected device is operated.

When the device changes its position, the circuit of relay 218, which is assumed to be associated with that device, is opened, and the sender switch CS is started to transmit a supervisory signal to position the switch SUPY on the contacts through which the lamps associated with the key K1 are controlled. In this case, the sender CS transmits a single impulse to position the wipers on the desired contacts set. The lamp signals are operated to advise the despatcher that the device which he has selected has been properly operated.

If during the interval that the despatcher had the control circuit energized and the selecting switches off-normal, a device at substation 1 became automatically operated, when the sender CS was operated to report the change brought about by the despatcher, it would also report any other changes which had occurred and had not been reported. If a device in substation 3 for example, was operated while the control circuit was engaged, that device would attempt to send in its signal as soon as the selecting switch SEL2 got back to normal. Obviously if substation 1 and substation 3 were trying to transmit impulses at the same time, a jamming would occur, and neither signal would be properly recorded. Therefore in the substation 3, and in all of the substations except 1, delay relays are provided. These delay relays, delay the starting of the sender switch for an interval sufficiently long to permit the substation 1 to move CS off normal to start sending its signal before the substation 2 has a chance to start, and in turn the substation 3 waits until after the substation 2 has had an opportunity to start its signal before it is started. The details of this arrangement will be best understood from the detailed description which follows.

It may happen that the selecting switches get out of step with the sender SEN, and as a result will not arrive at their home positions simultaneously and with the sender. The chain circuit referred to above will not be closed, and the selected device cannot be operated. To remedy a condition of this kind the despatcher operates a special key, sending alternating current out over the trunk conductors. This current energizes a relay at each substation, that relay erasing any operation that is set up on the trigger relays and closing a self controlled restoring circuit for the station selector. Each selector operates in a buzzer like manner, stopping when its home position is reached. With the switches realigned the despatcher can proceed with the control of the substation devices.

Having thus described my invention in general, I will now proceed with a detailed description of its operation.

*The despatcher operates a device in the substation.*

Assume now that the despatcher desires to operate the circuit breaker #1 in substation #1. To do this he must transmit a single impulse over the control circuit, to position the selector switch SEL—1 upon its first bank contact. The keys K1 and K'1 are associated with this particular device, and the despatcher to select the device operates the selecting key K'1 which moves spring 38 away from its resting contact. This operation removes neutral from conductor 85, thereby removing neutral potential from the first contact in the bank over which wiper 24 rotates. Spring 38 closes against its make contact and completes the circuit from neutral through conductor 86, through the normal position and wiper 24 of the switch SEN, through the contacts 55 through the winding of relay 3 to negative. The impulsing relay 6 is constantly operating, energizing over a circuit from neutral through the winding of the relay, through the resistance 7, to negative. Upon energizing, the relay 6 closes spring 56, thereby shunting itself out connecting neutral through these springs and resistance 7 to negative. Interrupter springs 55 will therefore be alternately opened and closed and relay 3 will pull up during the interval that the springs are closed. Relay 3 upon pulling up closes the obvious circuit through springs 53 for the slow-to-release relay 2. Relay 3 upon pulling up closes springs 52, which is without particular effect at this time. Relay 6 continuing to operate opens the circuit of relay 3 which falls back, and at spring 53 and its break contact closes a circuit through springs 51 to the relay 1, that relay energizing over this circuit.

Relays 1 and 2 have a copper slug on the heel piece end of their cores, which make them slow to release. These relays, when once energized, will remain in their energized positions during the interval that their circuits are held open by impulsing relay 3. Relay 1 at springs 50, closes a point in the impulsing circuit to the substation. Relay 3 upon reenergizing when springs 55 are again closed, closes the impulse circuit to transmit the first impulse, over a circuit traceable from the negative through springs 50, springs 52, conductor 80, thence over parallel paths, the first through the winding of relay 4 to neutral, the second through the winding of relay 101 of the substation #1 to neutral, the third through the relay 110 at substation #2 to neutral, and the fourth through the relay 301 of the last substation, to neutral. These relays energize over this circuit, relay 4 to close at springs 54 a circuit from neutral through the winding of magnet 5 to negative, with a parallel branch over conductor 92 through the slow-releasing relay 8 to negative. Magnet 5 energizes over this circuit, preparatory to advancing the wipers 24 to 26, inclusive, of the sender. Relay 8 energizes over this circuit, to open a point in the control circuit, to prevent the operation of that circuit at this time. Relay 101, closes through springs 120, a circuit from neutral through the winding of magnet 102 to negative, energizing the magnet 102 which prepares to advance the wipers 136 to 138, inclusive, of the selector SEL—1. Similarly relay 110, closes a circuit for the motor magnet of the selector switch at the substation 2, that motor magnet and wipers of the selector switch having been omitted to avoid duplication in drawings. In the last substation, relay 301 closes a similar circuit for the motor magnet of the selector switch SEL2, that motor magnet having also been omitted from the drawings. When the springs 55 again open, relay 3 deenergizes, the relays 4, 101, 110, and 301 also deenergize, each in turn opening the circuit of the motor magnet of its switch, to permit that magnet to fall back and advance the switch wipers one step. Since the key K'—1 is operated, wiper 24 will engage an open circuit on the contact to which conductor 85 is connected, and the circuit of relay 3 will consequently remain opened, so that further operations of the interrupter relay 6 are without effect at this time. With the selecting switches in this position, a circuit is prepared to the winding of the polarized relay 104 in the substation 1. The wipers corresponding to the wiper 136 in the other substations, engage open contacts, therefore do not extend any circuits. The despatcher now operates the operating key K1. Since it is assumed that he desires to open the switch associated with relay 104, he operates the key K1 to close springs 39 and 40. A circuit may now be traced from positive through resistance 9, conductor 94, springs 40, conductor 88, the first bank contact and wiper 25, springs 57, relay 8 having fallen back shortly after relay 3 deenergized, conductor 81, through wiper 136 and its first bank contact, through the winding of relay 104 to neutral. Relay 104 energizes over this circuit in such a direction as to close springs 122, thereby closing a circuit from neutral over conductor 147, through the winding of relay 108 to negative. Relay 108 energizes over this circuit, and at springs 129 locks itself to neutral through springs 150, conductor 154, and springs 126, independent of the polar relay 104. The energization of relay 108 prepares at springs 130 a point in the circuit to the auxiliary relay to open the device, that circuit being maintained open at this time at springs 131 of the relay 109.

After the despatcher has held key K1 operated long enough to insure that the polar relay has properly operated, he restores key K'1, thereby placing neutral on the bank contact engaged by wiper 24 to complete the circuit of impulsing relay 3. Relay 3 then operates, closing the above traced circuit for relays 4, 101, 110, and 301 to step the switches in the despatcher's station and the substations over their banks into their normal positions. When the sender SEN reaches its normal position, wiper 24 encounters the contacts to which conductor 86 is connected, and if no selecting keys are operated, that wiper will not pick up neutral potential, and the switches will come to rest.

*Operating the selected device*

When the selecting switches and the sender come to rest in their normal positions, the chain circuit is again closed, and the device which has been prepared is operated. When the wiper 26 of the sender switch SEN reaches its home position, it closes a circuit from neutral through the winding of relay 11 to negative, energizing that relay. The energization of relay 11 completes the chain circuit, traceable from negative through springs 59, conductor 82, wiper 138 in its home position, relay 109, conductor 144, springs 255, conductor 145, wiper 139 of the selecting switch in the second substation, relay 111, springs 135, conductor 146, thence through the wipers, corresponding relays and springs in the other substations, conductor 146 in the last substation, wiper 342 in its home position, relay 302, conductor 350, through springs 333 to neutral. If all of the selecting switches have arrived in their home positions, relays 109, 111, and 302 energize over this circuit. If any of the switches fail to reach the home position, this chain circuit will not be completed and the relays will not energize, therefore the selected device will not be operated. The energization of relay 109, completes the circuit from neutral through springs 131, springs 130, thence to the auxiliary relay which opens the device 1. This circuit also extends through the winding of relay 105 to negative, that relay being slow to pull up does not immediately energize. After a brief interval relay 105 energizes, closing a circuit from neutral through springs 125 for the slow-to-pull-up relay 106 to negative. Relay 106 energizes, and at springs 126 opens the locking circuit for relay 108 permitting that relay to fall back and at springs 130 open the circuit of the auxiliary relay. Thus it will be seen that the circuit of the auxiliary relay is closed for a brief interval of time dependent upon the operation of relays 106, 105, and 108. Maintaining the auxiliary relay energized for this brief interval operates the device 1, which may be a circuit breaker, that device being held in its operated position by the usual mechanical latches. If the circuit through this circuit breaker is in such a condition that the current flow therein is excessive, the automatic release devices come into play as soon as the auxiliary relay is deenergized, thereby permitting the breaker to clear itself from the faulty circuit.

*Supervision*

When the device #1 is operated, contacts 269 are opened and contacts 267 closed by the auxiliary spring on the device. Opening the contacts 269 opens a point in the circuit of normally energized relay 218, permitting that relay to restore. The restoration of relay 218 closes at springs 263 the obvious circuit for relay 217, energizing that relay to start the sender CS to transmit a signal indicating the new position of the device. The energization of relay 217 places neutral on conductor 284 through springs 259, completing a circuit through springs 252, through the winding of relay 212 to negative, with a branch circuit extending through springs 254 and thence through relays 213 and 214 in parallel to negative. Relays 212 and 214 have a copper slug on the armature end of their cores and are therefore slow to pull up and do not immediately energize. Relay 213 has a copper slug on the heel end of its core, which makes it slow to release without appreciably lengthening the time required for it to pull up. Relay 213 energizes, locking itself to neutral through springs 257. At springs 256, relay 213 opens a point in the circuit of start relay 210, thereby preventing the energization of that relay prior to the restoration of relay 213. At springs 255, relay 213 opens a point in the chain circuit extended through relays 109, 111, and 302, permitting those relays to deenergize, for a purpose which will be explained hereinafter. A moment later relays 212 and 214 energize, the former to open the circuit of relay 213 at springs 254, and the latter to shunt out relay 213 over the circuit through springs 258 and resistance 215 to neutral. Relay 213 deenergizes after an interval to reestablish the chain circuit and the circuit through start relay 210.

Returning now to the energization of relay 217, at spring 260 and its break contact this relay removes neutral from the first bank contact over which wiper 249 rotates, for a purpose which will be explained hereinafter. At springs 260 and its make contact, relay 217 closes a circuit from neutral through conductor 283, springs 253, conductor 143, through springs 132, conductor 142, through the winding of start relay 210, through springs 251, to neutral at springs 256. Relay 210 energizes over this circuit, and at springs 246 closes the obvious circuit for the relay 209, which energizes. Relay 210 also closes a circuit from neutral through springs 247 through the home position and wiper 249 of the counting switch CS, springs 245, conductor 281, impulse springs 232, through the winding of impulsing relay 203 to negative. Relay 203 pulls up over this circuit, closing a circuit from neutral through spring 234 and its make contact through the winding of relay 204 to negative. Relay 204 energizes over this circuit, and at springs 235 prepares a point in the circuit of relay 208. At springs 236, relay 204 prepares a locking circuit for itself, that circuit being held open at the moment at springs 237 of relay 205. When the impulse springs 232 are opened, responsive to the deenergization of the interrupter relay 202, relay 203 falls back, closing a circuit from neutral through springs 234, through springs 235 through the winding of relay 208 to negative. Relay 208 energizes over this circuit, at springs 241 opens a point in the circuit of relay 207, and at springs 240 closes a point in the impulsing circuit. When relay 203 reenergizes, it opens the circuit of relay 208, however, relay 208 is equipped with a copper slug on its core and is therefore slow to release and does not immediately deenergize. The energization of relay 203 closes a circuit from neutral through springs 133, conductor 141, springs 240, springs 233, thence over parallel paths, the one through the winding of relay 200 to negative, the other over conductor 140, springs 124, conductor 81, springs 58, through the winding of relay 18 to negative. Relays 200 and 18 energize over this circuit, the former to close the obvious circuit for the motor magnet 216 of the switch CS, and the latter to close the obvious circuit through springs 66 for the motor magnet 12 of the supervisory switch SUPY. When the interrupter springs 232 again open the circuit of relay 203 to permit that relay to fall back, it reestablishes the circuit through relay 208 at springs 234 to maintain that relay energized, and opens the circuit of relays 18 and 200. Relay 18 falls back, opening the circuit of the motor magnet 12, which deenergizes and advances the wipers 27 and 28 of the supervisory switch SUPY into engagement with their first bank contacts. Relay 200 falls back, opening the circuit of the motor magnet 216 which deenergizes and advances the wipers 248–250, inclusive, of the counting switch CS into engagement with their first bank contacts. Wiper 248 of the counting switch CS, extends a circuit from neutral through that wiper and the multiple contacts of the bank, through the contacts 243, the winding of relay 209 to negative, to maintain relay 209 energized independent of the relay 210. Wiper 249 fails to pick up neutral potential, since relay 217 associated with the device 1 is in its energized position, therefore, when interrupter springs 232 again close, relay 203 does not energize.

It will be noted that the impulses sent over conductor 81 as pointed out above, traverse a circuit through springs 124' and relay 200' to negative, in each of the other substations on the trunk. The relays 200' energize over this circuit to close the circuits of their respective motor magnets 216'. By this arrangement, the counting switches CS', not shown, in each of the other substations, step in synchronism with the switches CS and SUPY. The purpose of this arrangement will be explained hereinafter.

The advancing of wiper 27 into engagement with its first bank contact connects the circuit through the multiple contacts from neutral through the relay 16 to negative, energizing the relay 16 which at spring 64 prepares a point in the operating circuit of the supervisory relay. When relay 18 energizes as explained above, it closes the obvious circuit for relay 17, which energizes and remains energized as long as impulses are delivered to the relay 18. However, since the relay 203 does not again energize, relay 17 soon deenergizes, thereby closing a circuit from neutral through springs 65, springs 64, wiper 28, spring 69 and its break contact, through the winding relay 21 to negative, energizing relay 21. The energization of relay 21 changes the supervisory signals to indicate the new position of the device 1, in a manner which will be pointed out hereinafter.

Returning to the operation of the counting switch CS, when relay 203 fails to energize, the circuit of relay 208 remains open sufficiently long to permit that relay to deenergize. The deenergization of relay 208 closes the circuit from the neutral placed on the multipled bank contacts by wiper 248, through springs 241, through the winding of slow-to-pull-up relay 207. This relay is equipped with a copper slug on the armature end of its core, to render it slightly slow to pull up. After an interval, relay 207 pulls up, closing a circuit for slow-to-pull-up relay 206 which energizes after a similar brief interval, to close a circuit for slow-to-pull-up relay 205. Relay 205, upon energizing, closes at springs 272 a circuit from neutral through springs 244, 242, conductor 282, wiper 250 and its first bank contact, through the winding of relay 218 to negative. Relay 218 energizes over this circuit, locks itself to the contacts 267, through springs 264. The energization of relay 218 opens a point in the circuit of relay 217, permitting that relay to fall back. The restoration of relay 217 replaces neutral through springs 260, to the first bank contact now engaged by wiper 249, thereby restoring neutral potential to the relay 203 which will energize when the impulsing springs 232 are closed. The energization of relay 203 closes a circuit for relay 204, which energizes and locks itself through springs 236 and 237 to neutral. When relay 203 falls back, the circuit of relay 208 is again completed, that relay pulls up to close at the springs 240 a point in the impulsing circuit. The impulsing, which has been previously explained, now continues, the switch CS and the switch SUPY being operated in synchronism until the wiper 249 reaches its home position. Returning now to the operation of the counting switch CS when the wiper 248 was moved out of its normal position, it will be seen that the circuit of normally energized relay 211 was opened, permitting that relay to fall back for a purpose which will be explained in detail hereinafter. Relay 211 is therefore deenergized as long as the counting switch is off-normal, and when that switch returns to its normal position, that relay is reenergized in readiness for the transmission of another signal. Similarly, when the switches CS' in the other substations are moved out of their normal positions in synchronism with CS, corresponding relays such as 307 are deenergized, and so remain until CS' get back to their normal positions.

Referring now to the despatcher's station at the time at which relay 21 was operated, it will be noted that with relay 21 in its normal position, a circuit can be traced from neutral through resistance 19, through spring 67 and its break contact, conductor 93, through the red lamp 44, conductor 90, through the resistance 20, to negative. The red lamp 44 is therefore lighted, to indicate that the device #1 is in its closed position. When the despatcher's operated key K1 closed springs 39 and 40, a circuit is closed for the white lamp 43, traceable from the neutral previously traced to conductor 93, through the lamp 43, through spring 39 and its make contact, to conductor 90, thence through resistance 20 to negative. The white lamp 43 is lighted over this circuit to indicate that the position of the key does not correspond with the position of the switching device and that a new signal is to be received. When relay 21 energized, as hereinbefore explained, at springs 67 it opens the circuit of the red lamp 44, and closes the circuit for the green lamp 45, that circuit being traceable from negative through resistance 20, spring 67 and its make contact, conductor 93, through the lamp 45, through resistance 19, to neutral. The green lamp lights and the red lamp 44 is extinguished, indicating that the device 1 is in its open position. The alteration of springs 67, opens the circuit just traced for the white lamp 43, extinguishing that lamp to indicate that the key K1 and the signal lamp associated therewith are in the same position as the device #1. The energization of relay 21 closes at springs 68 a point in the circuit of relay 22, however, as long as relay 16 remains in its energized position, relay 22 has neutral on both of its terminals, and is therefore short circuited and does not energize. When the relay 16 falls back, as it will as soon as the supervisory switch SUPY returns to its normal position, relay 22 energizes over a circuit traceable from neutral through that relay, through springs 68, through relay 21 to negative. Relay 21 is maintained energized over this circuit, so that the supervisory signal is maintained until it is again changed by the switch SUPY. When the device again changes its position and the wiper 28 comes to rest on the contact leading to springs 69, relay 17 falls back and completes the circuit from neutral through the winding of relay 23 to negative. Relay 23 energizes and at springs 70 connects negative to the junction of relays 21 and 22. Relay 21 being thereby short circuited, restores and alters the signal lamps to correspond to the new position of the device. Relay 22 is maintained energized until the wiper 28 moves off the contact, whereupon relays 22 and 23 restore. From the foregoing description, it will be noted that an operation of a device in the substation transmits a signal to the despatcher's station to readjust the signal lamps there to correspond to the new position of the device. It is immaterial whether the operation of the device is performed by the despatcher or automatically, the supervisory switch functioning just the same in either case. If another circuit breaker in the substation I had operated after the control trunk had been seized, the switch CS would have stopped when the wiper 249 encountered the contact associated with that device, and the relay in the despatcher's station corresponding thereto would have been reoperated to indicate the change.

*Simultaneous operation*

From the foregoing it will be obvious that the simultaneous operation of two circuit breakers in the same substation does not present any difficulty to the supervisory equipment since the corresponding lamps are controlled through different bank contacts wiped over by wiper 28. The counting switch CS will be started, and will stop upon the contacts associated with the devices in turn. However, if two circuit breakers located in different substantions change their positions simultaneously, both will try to transmit a signal to the despatcher's station at the same time with a result that neither signal will be registered. To prevent this, I have provided a delay circuit, the operation of which is as follows: It will be noted that in the substation #1, responsive to the deenergization of relay 218 or some other signal relay of the group, the companion relay, such as relay 217, is energized, and neutral potential is put on conductor 283 to complete a circuit through contacts on the normally energized relay 211, through the winding of the start relay 210 to neutral battery at springs 256. In the substation #3, shown in Fig. 3, when ground is placed on conductor 283' by a signal relay 312, it traverses a circuit through springs 322 on the normally closed relay 302, through conductor 352, and thence through a slow-to-pull-up relay 303, to negative rather than through the start relay 306. Relay 303 energizes to close a circuit for the second slow-to-pull-up relay 304 which energizes after an interval to close a circuit for the third relay 305 which energizes after an interval to close a circuit for the start relay 306. In the drawings I have shown a chain of three relays which are energized ahead of the start relay, and indicated by a dotted line the possibility of inserting more relays in this chain. The number of relays depends upon the length of time during which it is necessary to delay the energization of the start relay, that length of time being dependent upon the number of substations on the trunk line. If then, a switching device in substation #1 changes position simultaneously with a switching device in substations 2 and 3, the start relay of the counting switch CS in the #1 substation would energize before the start relay in the other substations. The counting switch CS will operate in the manner hereinbefore described to transmit this signal indicating the new position of the device. The operation of switch CS steps the switches CS' in the other substations out of their normal positions. Relay 307 in substation 3, and the corresponding relays in the other substations deenergize. The deenergization of relay 307 opens at springs 331 the circuit of relay 303. Relay 303, and the other chain relays controlled thereby deenergize, and remain deenergized until the stepping switches are again brought into their normal positions. As soon as relay 307 reenergizes, relay 303 energizes to start the chain relays in operation preparatory to energizing start relay 306. However, when relay 309 energizes, as it will a moment after relay 307 comes up, the inter substation chain circuit is opened and relay 302 falls back momentarily to open the circuit of relay 304 at springs 321 and of 303 at springs 322. Similarly in the substation #2, relay 112 opens a point in the inter substation chain circuit, to deenergize relay 111 to delay the starting of the start relay chain in that substation. When the chain is again completed, relays 111, 302, reenergize, the relay set in the #2 substation and the relay set in the #3 substation will start to energize. The #2 substation will complete the circuit to the start relay before the #3 substation does, and the counting switch in the #2 substation will then operate to transmit the signal indicating the changed position of the device in the #2 substation. The slow acting device in the #3 substation is reset to normal when the counting switch CS' moves out of normal and deenergizes relay 307, which remains back until after the counting switch in the #2 substation has completely operated. When the relay 307 again energizes, the relays 303—306 are energized in immediate sequence, since the relay 309 does not reenergize to again open the circuit of relays 302, 111, and 109.

In the event that the devices in two or more substations have changed their positions when the counting switches are off-normal, the normally energized relay controlled through the wiper 248 of the counting switch in each of the substations will be deenergized and therefore the relay 212 cannot be energized immediately. When the operating counting switch gets back to its normal position and the relay 211 is reenergized, the relay 212 in each substation energizes, the chain circuit through the relays is opened by the operation of the relay 213. The opening of the chain circuit at this time resets the slow acting devices to normal, starting them all in operation at the same time. By this arrangement the spacing between the various substations is maintained.

Resetting the selecting switches

From the foregoing it will be noted that the proper operation of the system of this invention depends upon the synchronized operation of the selecting switches in the substations and the sender switch at the despatcher's station. If these switches get out of step, they will not arrive at their home positions simultaneously, and consequently the chain circuit will not be closed. In this case, before the despatcher can operate any of the devices in any of the substations, he must reset the switches so that they will all be standing at their home position at the same time. I have provided for this purpose, an alternating current reset circuit, comprising alternating current relays 113, 115, and 314 in the substations 1, 2, and 3, respectively, which are controlled by the key springs 71 and 72. If one of the switches get out of step, the despatcher operates the key springs 71 and 72 closing a circuit from the alternating current generator 73 through springs 71, conductor 80, through the condenser, relay 113 and the resistance associated therewith, conductor 81 back to the key springs 72 to the other side of the generator, with parallel branches from the conductor 80 through the alternating current relay 115, and the alternating current relay 314 to the conductor 81. These alternating current relays energize over this circuit. In the substation 1, the energization of relay 113 closes a circuit from neutral through springs 152 thence over parallel paths the one through slow-to-pull-up relay 114 to negative, and the other through springs 151 to the normal position contact and the wiper 137, through the winding of relay 104 to negative. Relays 114 and 104 energize over this circuit, relay 104 energizing first because of the slow action of relay 114. The neutral placed upon the home position contact by the relay 113, also traverses the circuit through springs 153, through the interrupter springs 154, through the winding of the motor magnet 102 to negative. Motor magnet 102 energizes over this circuit, interrupting its own circuit at springs 154 and falling back to advance the wipers 136 to 138 one step. Wiper 137 now picks up neutral from the multiple bank contacts, over a circuit independent of the contacts 151 of the relay 114 and the motor magnet continues to operate in a buzzer like fashion to sweep the wipers over the bank contacts. After the wiper 137 has been stepped out of its home position and before it again reaches its home position, relay 114 energizes, removing the neutral battery from the home position contact to stop the switch at that point. The energization of relay 114 opens at springs 150 the locking circuit through which the trigger relays 107 or 108 are locked energized. If the despatcher in the operation in which the selecting switch has got out of step energized either the relay 107 or the relay 108 to perform a switching operation with the device 1, the removal of neutral at springs 150 will permit the energized relay to fall back, thereby erasing the operation which the despatcher has attempted to perform.

Similarly the energization of relay 115 operates the motor magnet associated with the selector switch in the substation 2, now shown, to reset that selector into its normal position in the manner just pointed out. The operation of alternating current relay 314 in the substation 3 also sets that selector switch to normal in the same manner. The despatcher holds the key springs 71 and 72 closed long enough to allow time for all of the selecting switches to reposition themselves in their normal positions after which he releases the key. He may now reattempt the operation which he has tried, by reoperating the selector key and a control key, and if the selecting switches operate in synchronism, the control will be carried on in the manner hereinbefore pointed out.

While I have chosen to show my invention in connection with a particular type of apparatus, I am not to be limited by that disclosure, as there are many adaptations and modifications which can be made by one skilled in the art without departing from the spirit and scope of the invention. I have chosen to represent my system in connection with a remote control system, in which power switching devices are controlled. It will be appreciated, that this system is equally adaptable to control the semaphores and switches in a train despatching system, as well as to many other similar uses.

What I consider new and desire to have protected by Letters Patent is pointed out in the appended claims.

What is claimed is:

1. In a remote control system, a trunk line, a plurality of selecting switches on said trunk line, a plurality of switching devices associated with each of said selecting switches, means for operating said switches to select devices, means controlled through said switches over said trunk line for moving said devices from one position to another, a supervisory switch associated with each of said selecting switches, means responsive to a movement of one of said devices for starting said supervisory switch to transmit a signal over said trunk line to indicate the new position of the device, and means controlled over circuits jointly completed through the normal positions of said selecting switches and through the normal positions of said supervisory switches for preventing the simultaneous transmissions of two or more signals.

2. In a remote control system, a trunk line comprising a plurality of conductors, a selecting switch, a relay associated with said switch and connected to an impulsing one of said conductors, a plurality of polarized relays selectable by said selecting switch, means for transmitting impulses of direct current over said impulsing conductor to operate said relay, said selector switch operated responsive to the operation of said relay for selecting one of said polarized relays, means for operating said selected polarized relay over a circuit including a second one of said trunk conductors, means operated by said polarized relay for preparing an operating circuit, means controlled over said trunk line for completing said prepared operating circuit, and means including a relay operated by alternating current sent over said first and second trunk conductors for erasing said prepared operating circuit before its completion.

3. In a remote control system, a trunk line, a plurality of selecting switches on said trunk line, a row of contacts and a wiper having access thereto on each of said switches, a group of relays connected to the contacts of each of said switches, said connections being staggered, means for operating said selecting switches in synchronism to position the wiper of one of them on a contact leading to one of said relays to select that relay, a switching device associated with said selected relay, means for operating said selected relay to prepare an operating circuit for the associated device, a series circuit including said trunk line and a certain contact in each of said switches, and means controlled over said series circuit for preventing the completion of said prepared circuit if said selecting switches get out of synchronism.

4. In a remote control system, a trunk line, a plurality of selecting switches on said trunk line, a row of contacts and a wiper having access thereto on each of said switches, a group of relays connected to the contacts of each of said switches, said connections being staggered, means for operating said selecting switches in synchronism to position the wiper of one of them on a contact leading to one of said relays to select that relay, a switching device associated with said selected relay, means for operating said selected relay to prepare an operating circuit for the associated device, a series circuit including said trunk line and each of said switches, means controlled over said series circuit for completing said prepared circuit if said switches operate synchronously, and means for erasing said prepared circuit and for resynchronizing said selecting switches.

5. In a remote control system, a plurality of supervisory switches, each having a normal position, the trunk line between said switches, means for registering signals in said supervisory switches, means controlled by said first means for momentarily opening a conductor of said trunk line to temporarily prevent the transmission of said registered signals, and means including a variable number of timing relays in each switch operated within varying time limits after said momentary opening for starting said switches to transmit their respective registered signals over said trunk line in a definite sequence in accordance with the number of timing relays associated with each switch.

6. In a remote control system, a trunk line, a plurality of selecting switches having normal positions on said trunk line, a row of contacts and a wiper having access thereto on each of said switches, a group of devices associated with each of said switches, a relay individual to each of said devices said relays being connected to said contacts, means for operating said switches over said trunk line in synchronism to position the wiper of one of them on the contact selecting a particular relay, control relays associated with each of said devices, means for operating the selected relay to energize one of said control relays to prepare an operating circuit to the selected device, a series circuit including said trunk line extending through the normal positions of said switches, and means controlled over said series circuit and cooperating with said energized control relay to close said operating circuit for a definite short interval to operate the selected device.

7. In a remote control system, a trunk line, a plurality of selecting switches on said trunk line, a row of contacts and a wiper having access thereto on each of said switches, a group of relays connected to the contacts of each of said switches, said connections being staggered, means for operating said selecting switches in synchronism to position the wiper of one of them on a contact leading to one of said relays to select that relay, a switching device associated with said selected relay, means for operating said selected relay to prepare an operating circuit for the associated device, means for completing said prepared circuit if said switches operate synchronously, and means responsive to the presence of alternating current on said trunk line for erasing said prepared circuit and for resynchronizing said selecting switches.

8. In a remote control system, a trunk line, a plurality of selecting switches on said trunk line, a row of contacts and a wiper having access thereto on each of said switches, a group of devices connected to the contacts of each of said switches said connections being staggered, means for operating said selecting switches in synchronism over said trunk line to position the wiper of one of them on a contact connected to a device to select that device means for preparing an operating circuit for the selected device, means for completing said prepared operating circuit if said switches operate in synchronism, means for impressing an alternating current on said trunk line, and means responsive to said alternating current for erasing said prepared operating circuit.

9. In a remote control system, a trunk line, a plurality of selecting switches each having a normal position, said switches connected in multiple to said trunk line, switching devices associated with each of said selecting switches, means for operating said switches to cause one of said switches to select one of said devices, means controlled over said trunk line for preparing an operating circuit for the selected device, means for continuing the operation of said switches to return them to their normal positions, a chain circuit extending through the normal position on each of said switches in serial relation, and means controlled over said chain circuit for completing said prepared operating circuit to operate said device only in case said chain circuit through the normal positions on each of said switches is completed.

10. In a remote control ssytem, a trunk line, a plurality of selecting switches each having a normal position, said switches connected in multiple to said trunk line, switching devices associated with each of said selecting switches, means for operating said switches to cause one of said switches to select one of said devices, means controlled over said trunk line for preparing an operating circuit for the selected device, means for continuing the operation of said switches to return them to their normal positions, a chain circuit extending through the normal position on each of said switches in serial relation, and means controlled over said chain circuit and including a timing device for completing said prepared operating circuit for a definite interval to operate said device only in case said chain circuit is completed.

11. In a remote control system, a trunk line, a plurality of selecting switches each having a normal position, said switches connected in multiple to said trunk line, switching devices associated with each of said selecting switches, means for operating said switches to cause one of said switches to select one of said devices and all of said switches to return to their normal positions, a relay associated with said selected device, means for operating said relay over said trunk line to prepare an operating circuit for the device, a chain circuit extending through the normal position on each of said switches in serial relation, and means operated over said chain circuit only in case said chain circuit is completed when all said switches return to their normal positions for completing said prepared operating circuit for a definite interval to operate the device.

12. In a remote control system, a trunk line, a plurality of selecting switches each having a normal position, said switches connected in multiple to said trunk line, switching devices associated with each of said selecting switches, means for operating said switches to cause one of said switches to select one of said devices and all of said switches to return to their normal positions, a first relay and two control relays associated with said selected device, means for operating said first relay over said trunk line to energize one of said control relays, means controlled by the energized control relay for preparing an operating circuit for said device, a chain circuit extending through the normal position on each of said switches in serial relation, and means controlled over said chain circuit only in case said chain circuit is completed for closing said prepared circuit to operate said device.

13. In a remote control system, a trunk line, a plurality of selecting switches each having a normal position, said switches connected in multiple to said trunk line, a plurality of switching devices accessible to each of said switches, means for operating said switches in synchronism by direct current impulses transmitted over said trunk line to cause one of said switches to select one of said devices and to cause all of said switches thereafter to return to their normal positions, means responsive to all said switches reaching their normal positions for operating said selected device, and means for erasing said selection and for automatically moving said switches into their normal positions without operating the selected device, when the said device operating means operates responsive to the switches reaching their normal positions.

14. In a control system, a trunk line, a selecting switch having a normal position, a plurality of switching devices, means controlled over said trunk line for operating said switch to select a desired one of said devices, means controlled over said trunk line for preparing an operating circuit for the selected device, means for continuing the operation of said switch to return it to its normal position, means for maintaining said operating circuit prepared during the return to normal of said switch, means controlled over said trunk line for completing said operating circuit in response to said switch reaching its normal position, and means responsive to the application of alternating current to said trunk line for erasing said prepared operating circuit and for returning said switch to its normal position independent of the said other return to normal means.

15. In a control system, a trunk line, a selecting switch having a normal position, a plurality of switching devices, means controlled over said trunk line for operating said switch to select a desired one of said devices, means controlled over said trunk line for preparing an operating circuit for the selected device, means for continuing the operation of said switch to return it to its normal position, means for maintaining said operating circuit prepared during the return to normal of said switch, means controlled over said trunk line responsive to said switch reaching its normal position for completing the prepared operating circuit to operate the selected device, and means associated with said switch and responsive to the application of alternating current to said trunk line before said switch reaches its normal position for erasing said prepared circuit to prevent the operation of said device.

16. In a remote control system, a control station and a sub-station, a trunk line connecting the control station with the sub-station, a selector switch in the sub-station, a plurality of switching devices in the sub-station, means at the sub-station controlled over one of the conductors of said trunk line from the central station for operating said switch to select a desired one of said devices, means at the sub-station controlled over another conductor of said trunk line at the will of the dispatcher in the control station for preparing an operating circuit to operate the selected device, additional means controlled over said trunk line for completing said prepared operating circuit to operate the selected device, and further means at the sub-station controlled over both said conductors in series at the will of the dispatcher in the control station for erasing said prepared circuit without operating said device.

17. In a remote control system, a trunk line, a plurality of selecting switches on said trunk line, a group of switching devices accessible to each of said switches, means for operating said selecting switches in synchronism over said trunk line to cause one of said switches to select a desired one of said devices, means for preparing an operating circuit for the selected device, means or completing said prepared operating circuit if said switches operate in synchronism, means for impressing an alternating current on said trunk line, and means responsive to said alternating current for erasing said prepared operating circuit.

18. In a remote control system, a trunk line, a plurality of selecting switches each having a normal position, said switches connected in multiple to said trunk line, switching devices associated with each of said selecting switches, means for operating said switches over said trunk line to cause each one of said switches to select one or more of said devices in a single cycle of selective operation, means associated with each switch controlled over said trunk line for preparing an operating circuit for each of the selected devices, means for continuing the operation of said switches to return them to their normal positions after said single cycle of selective operation, a chain circuit extending through the normal position in each of said switches in serial relation, and means associated with each switch controlled over said chain circuit for simultaneously completing all of said prepared operating circuits to simultaneously operate all said selected devices only in case said chain circuit through the normal positions on each of said switches is completed.

In witness whereof, I hereunto subscribe my name this 5th day of October, A. D. 1927.

ALFRED H. BELLIVEAU.